United States Patent

[11] 3,615,759

[72] Inventors Robert A. Busdiecker
  Woodville;
  James E. Rapp, Oregon, both of Ohio
[21] Appl. No. 833,865
[22] Filed June 2, 1969
[45] Patented Oct. 26, 1971
[73] Assignee Owens-Illinois, Inc.
  Continuation of application Ser. No.
  574,927, Aug. 25, 1966, now abandoned,
  Continuation-in-part of application Ser. No.
  518,447, Jan. 13, 1966, now Patent No.
  3,507,737, Continuation-in-part of
  application Ser. No. 522,020, Jan. 21,
  1966, now abandoned.

[54] SILICA-ALUMINA-LITHIA GLASSES, CERAMICS AND METHOD
  18 Claims, No Drawings
[52] U.S. Cl. .................................................. 106/39 DV,
  65/33, 106/52
[51] Int. Cl. .................................................. C04b 33/00
[50] Field of Search ...................................... 106/39, 52,
  54, 50; 65/33

[56] References Cited
  UNITED STATES PATENTS
1,532,002   3/1925   Thomson..................... 350/310
3,157,522   11/1964  Stookey...................... 106/52
3,241,985   3/1966   Kuwayama................... 106/39
3,252,811   5/1966   Beall ......................... 106/39
3,282,712   11/1966  Tashiro et al................ 106/39
3,238,085   3/1966   Hayami et al................ 106/39

FOREIGN PATENTS
1,300,614   6/1962   France ....................... 106/39

OTHER REFERENCES
A. Hummel– " Thermal Expansion Properties of Some Synthetic Lithia Minerals" – Vol. 34, No. 8, p. 238– 1951– J. Am. Cer. Soc., TP 785.A62

Primary Examiner—Tobias E. Levow
Assistant Examiner—W. R. Satterfield
Attorneys—W. A. Schaick and Charles S. Lynch ABSTRACT: Disclosed are new thermally crystallizable glasses in the silica-alumina-lithia system containing titanium oxide, zirconium oxide, and calcium oxide and being limited to very low percentages of ZnO, $P_2O_5$ and $B_2O_3$. Glass-ceramics of these same compositions and methods for making them by crystallizing such glasses are also disclosed, as are transparent glass-ceramic mirror blanks of low coefficients of expansion.

SILICA-ALUMINA-LITHIA GLASSES, CERAMICS AND METHOD

Disclosed are new thermally crystallizable glasses in the silica-alumina-lithia system containing titanium oxide, zirconium oxide, and calcium oxide and being limited to very low percentages of ZnO, $P_2O_5$ and $B_2O_3$. Glass-ceramics of these same compositions and methods for making them by crystallizing such glasses are also disclosed, as are transparent glass-ceramic mirror blanks of low coefficients of expansion. This application is a continuation of application Ser. No. 574,927 (now abandoned) which is a continuation-in-part of application Ser. No. 518,447 filed Jan. 3, 1966 (now U.S. Pat. No. 3,507,737) and of 522,020 filed Jan. 21, 1966, by the present inventors.

The present invention relates to new, thermally-crystallizable glasses of a limited composition range containing as essential constituents $SiO_2$, $Al_2O_3$, $Li_2O$, CaO, and either or both of $ZrO_2$ and $TiO_2$. In one aspect, the invention relates to new ceramics made by in situ crystallization of a multitude of finely divided crystals from such glasses. In still another aspect, the invention relates to a method for making ceramic articles by first forming articles of such glasses and thereafter thermally effecting in situ crystallization. In a more specific aspect, the invention relates to telescope mirror blanks of such ceramics made from such glasses by said in situ crystallization.

In Dutch Pat. application No. 6,509,945 there is set forth an advantageous composition range of thermally crystallizable glasses which are especially useful for making low-expansion and transparent articles, particularly telescope mirror blanks. The glass compositions of the present invention are of the general character set forth in said Dutch patent application, but they are of a limited composition range, and the specific compositions of the present invention solve a number of problems in producing essentially transparent, low-expansion articles, such as telescope mirror blanks, which must be quite uniform in composition and thermal expansion throughout the mass of the article finally produced as a result of the thermal in situ crystallization.

Some of these problems are set forth in connection with the aforesaid parent application Ser. No. 518,447.

One of the problems which is especially acute is that of producing a mirror blank or other article which is completely uniform throughout its cross section in composition. If it is not uniform, after the article has been crystallized, the coefficient of thermal expansion will also not be uniform, and the shape of the ground and figured mirror will undesirably change with change of temperature.

Another particular problem in producing such transparent, thermally-crystallized, essentially zero expansion telescope mirror blanks is the problem of having a glass which forms crystal nuclei too quickly or which crystallizes (grows crystals) at too fast a rate. Such problems arise and cause great difficulty both when making the lightweight telescope mirror blanks, described in the parent application, and also when making even a solid mirror blank, especially when the mirror blank is cast from a molten glass stream. Thus, if a stream of glass is being put into a mold and the outside surface of the stream of glass, either before or after being deposited on the surface of the molten glass in the mold, becomes too cool and is then covered with hot glass, the glass tends to prematurely nucleate and prematurely crystallize, causing streaks of relatively large crystals in the solid glass-ceramic blank to appear after it has been subjected to the normal nucleation and crystallization heat treatment. Another problem encountered, which is related to the tendency of some of the glasses in the cited Dutch application to form nuclei at too high a rate and to grow crystals at too fast a rate, is the tendency of some such glasses to surface crystallize under temperature conditions where the body of the glass blank does not crystallize. This is an especially serious problem.

We have now discovered thermally crystallizable glass compositions which overcome the foregoing problems and which can be thermally crystallized to transparent glass-ceramics containing a multitude of substantially homogeneously dispersed crystals by thermal in situ crystallization, to have an average lineal coefficient to thermal expansion over the range 0°–300° C. of from $-5$ to $+5 \times 10^{17}$ /° C.

The new glass and transparent glass-ceramic compositions of the present invention consist essentially of $SiO_2+Al_2O_3+CaO+Li_2O+TiO_2+ZrO_2+R_2O$. As stated in the second paragraph herein only one or the other of $TiO_2$ and $ZrO_2$ is essential in the present compositions. They preferably contain, disregarding small amounts of fining agents such as antimony oxides or arsenic oxides, 98–100 weight percent $SiO_2+Al_2O_3+CaO+Li_2O+TiO_2+ZrO_2+R_2O$. R is any alkali metal other than lithium, of Group I–A of the periodic table, but is usually sodium and/or potassium. The foregoing components are present in the total glass in the weight percent ranges set forth in the following table I:

TABLE I

| Component | Weight Percent |
| --- | --- |
| $SiO_2$ | 58–72 |
| $Al_2O_3$ | 19–24 |
| $Li_2O$ | 3.7–5 |
| CaO | 2–6 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2+ZrO_2$ | up to 4 |
| ($CaO+R_2O$ minus $Li_2O$) | less than 1 |

In addition, it has been found that, in order to overcome problems of nonuniformity caused by volatilization of components from the surface parts of the molten glass and in order to overcome the problem of high rates of nucleation and crystallization and the problem of surface crystallization, ZnO, $P_2O_5$ and $B_2O_3$ should be kept as low as possible. Thus, no more than 0.3 weight percent ZnO or $P_2O_5$ should be present and no more than 0.2 weight percent $B_2O_3$ should be present. Further, no more than 0.4% ZnO $P_2O_5$ and no more than 0.3% ZnO+$B_2O_3$ should be present. While these very small amounts may seem unimportant, it has been found that their adverse effect is extremely critical when present in larger amounts. Even when present in the amounts indicated, they are usually deleterious. For instance, $B_2O_3$ is a volatile component and it also causes volatilization of $Li_2O$ and $Na_2O$.

Thermally crystallizable glasses and glass-ceramics of the foregoing description that are usually most satisfactory have the following components, expressed in weight percent of the total composition, present in the composition in the more restricted range of the following table II:

TABLE II

| Component | Weight Percent |
| --- | --- |
| $SiO_2$ | 64–71 |
| $Al_2O_3$ | 19–24 |
| $Li_2O$ | 3.8–4.5 |
| CaO | 3–5 |
| $TiO_2$ | 0–2.5 |
| $ZrO_2$ | 0–4 |
| $Na_2O$ | 0–1 |
| $K_2O$ | 0–1 |
| Total $R_2O$ (not including $Li_2O$) | 0–1.5 |
| $TiO_2+ZrO_2$ | up to 4 |
| ($CaO+R_2O$ minus $Li_2O$) | less than 1 |

Once glass articles of a desired configuration have been formed, the articles are subjected to thermal in situ nucleation and crystallization heat treatment schedules to bring about the proper amount of nucleation and subsequent crystallization to produce a low-expansion crystallized glass-ceramic article such as a low-expansion crystallized glass-ceramic telescope mirror blank which is transparent. The nucleation and crystallization step temperature ranges will vary with the particular glass composition. However, when expressed in terms of glass viscosity, the nucleation step temperature range is usually in a range of from $10^{10}$ to $10^{14}$ poises, generally about $10^{11.5}$ poises. After nucleation is completed, the temperature of the thermally crystallizable glass can be increased to within a range where more rapid crystallization occurs, but usually not above the $10^8$ poise temperature of the original glass.

In making the transparent and low expansion articles such as mirror blanks of the present invention the upper crystallization temperature to which the article is subjected is usually not more than about 1,500° to about 1,650° or 1700° F., because too high a temperature will tend to produce an opaque article and also to undesirably increase the coefficient of expansion. The length of time that is necessary for nucleation and crystallization to take place will vary with composition, and with the size of the article, such as a telescope mirror blank, which is being produced. While from 2 to 100 hours may be adequate for a small mirror blank, 1000, 3000 or even more hours will be necessary for a telescope mirror blank having a larger diameter and having a thickness of about one-sixteenth of the diameter. This is necessary because glass is a very poor conductor of heat and it takes time to uniformly heat all areas of the mirror blank.

It should also be noted that the entire process of nucleation and crystallization can be effected at a low temperature in the range where the original glass has a viscosity of from about $10^{10}$ to $10^{14}$ poises. For example, see example IV where the glass was heated for 1,000 hours at the temperature where its viscosity was about $10^{.11.5}$ poises. Thus, as will be understood by those skilled in the art crystallization (crystal growth) can be effected in most instances at the same temperature as the nucleation step. At low temperatures where the rate of nuclei formation is relatively high, the crystallization rate is lower, much lower, than at higher temperatures. Nevertheless isothermal nucleation and crystallization can be effected at a single temperature if the time of heating is long enough as in example IV. The process at first is almost entirely one of nucleation, but eventually crystallization or crystal growth also takes place. Obviously, it is thus possible to effect nucleation and part of the crystallization at a low temperature, and subsequently to effect final crystallization in a higher temperature range.

In the present application the constituents of the glasses which we arbitrarily define as "nucleants" or "nucleating agents" are $ZrO_2$ and $TiO_2$. There have been theories espoused in the past that such "nucleating agents" form nuclei by precipitating as submicroscopic crystallites of $TiO_2$, $ZrO_2$, etc., and that the major crystalline species formed by later heat treatment crystallize directly upon these nuclei. However, it now appears probable that many of these prior art glasses, and also the glasses of the present invention, first form a microscopic or submicroscopic dispersed glass phase, and that this dispersed phase somehow initiates the formation of the main crystalline species, in some manner enabling the major crystalline species to crystallize substantially homogeneously throughout the mass of glass being heat treated, and helping to limit the maximum size of the crystals by providing many sites for crystal initiation. In any case, the term "nucleant" or "nucleating agent" as used in the present application refers to $TiO_2$ and $Zro_2$, and the term merely means that such oxides have the effect in the glass, when properly heat treated, of causing the formation of larger numbers of homogeneously dispersed crystals in the glass than would be the case without the nucleant. Further, the "nuclei" formed during the nucleation step are defined either as a finely dispersed submicroscopic immiscible glass phase or as submicroscopic precursors of crystalline species, or crystallites.

While an effective amount (up to 4 percent) of a nucleant, $RiO_2$ or $ZrO_2$ or both, is required in the compositions of the invention set forth in table I and table II, usually from 1.5 to 4 weight percent of $TiO_2$ plus $ZrO_2$ is employed in such compositions. In most instances the $TiO_2$ content is from 2 to 4 percent.

While the present application up to this point sets forth the lower limit of $Li_2O$ in the glass and ceramic compositions of tables I and II as being 3.7 and 3.8, respectively, as in application Ser. No. 522,020, we have now found that very satisfactory transparent glass-ceramics can be made when the $Li_2O$ range in compositions of these tables is 3 to 5 $Li_2O$. Although lowering the amount of $Li_2O$ from 3.7 or 3.8 to 3 has a powerful influence in raising the viscosity in the working range for a given glass, and thus increased forming problems, we have been able to press and to cast such compositions satisfactorily. Subsequent crystallization by thermal treatment gives a glass-ceramic having the desired expansion and transparency characteristics.

Glass-ceramic articles, such as telescope mirror blanks, of the present invention are formed from components of special compositions, namely, thermally crystallizable glasses, identified above, and being of the lithium calcium alumino-silicate system capable of being thermally in situ crystallized to form so-called glass-ceramics, preferably transparent, having a lineal coefficient of thermal expansion which is relatively low and can be about zero. Such glass-ceramics contain as the predominant crystalline species lithium-containing crystalline phases, either as beta-eucryptite or beta-eucryptitelike crystals or as beta-spodumene or beta-spodumenelike crystals, or both, as indicated by X-ray diffraction data. A multitude of such crystalline species, in random orientation and dispersed in a glassy matrix remaining as a result of in situ crystallization, are to be found in the glass-ceramic mirror blanks of the present invention. For a transparent (as transparent is defined herein) article such as a mirror blank, substantially all of the crystals of the thermally crystallized glass are of a diameter of less than about one-third micron measured across the largest lineal dimension of the crystal. The glass-ceramic has a lineal coefficient of thermal expansion of about $-5 \times 10^{17}$ to $+5 \times 10^{17}/$ C. (0°–300° C.) and preferably of about $-3$ to $3 \times 10^{17}$, although glass-ceramics of zero expansion are readily produced.

The ultimate telescope mirror blank and telescope mirror formed therefrom has an average lineal coefficient of thermal expansion of the glass-ceramic in the range of $+5$ to $-5 \times 10^{17}/°$ C., over the range 0°–300° C., and is preferably about zero over the range 0°–300° C., or over the range the mirror will be subjected to during use. Also, the glass-ceramic articles of the invention are defined as transparent when the crystals are less than about one-third micron measured across the largest lineal dimension of the crystals. Furthermore, while the diameter of the crystals within the transparent ceramic is less than about one-third micron, measured along the largest lineal dimension of the crystal, it is preferred that the crystals be of a diameter less than about one-fourth micron in size; the best results are evident when the diameter is less than about one-tenth micron in size.

A mirror blank having a concave surface can be made in accordance with the process of the present invention by the usual methods involving grinding, polishing and figuring to form the desired astronomical configuration and curvature, although a mirror having a concave surface can be made at the outset. By making the reflecting surface concave at the outset, the amount of work necessary to grind, polish and figure the surface is considerably reduced. A thin coating of aluminum is then usually applied on the prepared surface in accordance with known methods, although any other suitable means to render the face surface reflectant can be employed.

The terms "beta-eucryptite crystals" and "beta-eucryptitelike crystals" have been used in an alternative sense. Thus, while beta-eucryptite is often thought of as a species crystal having 1 mole of lithia, 1 mole of alumina and 2 moles of silica, both terms are used in this application to designate crystalline species having the beta-eucryptite structure as shown by X-ray diffraction, but the peaks can be shifted slightly, depending on whether there is a definite amount of silica present other than exactly 2 moles, either more or less silica than 2 moles. Similarly, the terms "beta-spodumene crystals" and "beta-spodumenelike crystals" are used alternatively and in a generic sense, specifying crystalline species that have the crystalline structure of beta-spodumene and contain 4 moles of silica to one of alumina and one of lithia, with the peaks shifted somewhat when the crystalline structure contains more or less than 4 moles of silica. In the claims, therefore, the terms "beta-eucryptite" and "beta-spodumene" are each used in this generic sense.

The following examples are merely illustrative of the invention and are not to be considered as limiting the scope of the invention in any manner. The 16-inch diameter blanks were of a nominal thickness of about 3.5 inches.

EXAMPLE I

A 16-inch telescope mirror blank is formed by melting together batch ingredients to form a molten glass and pouring the molten glass into a suitable graphite mold which has been preheated to about 800° F. As soon as the viscosity of the body is sufficiently high so as the body is self-supporting, it is removed from the mole and is air-quenched to miminize nuclei formation. Thereafter, the body or telescope mirror blank is subjected to a heat treatment of 1425° F. for 300 hours. It was observed that a satisfactory transparent, crystallized glass-ceramic mirror blank, having a coefficient of thermal expansion (0°–300° C.) of less than $2 \times 10^{17}$ was obtained.

The crystallizable glass composition had the following components indicated in weight percent, based on the total composition:

| Component | Weight Percent |
| --- | --- |
| $SiO_2$ | 67.34 |
| $Al_2O_3$ | 20.8 |
| CaO | 3.48 |
| $Li_2O$ | 3.87 |
| $TiO_2$ | 1.78 |
| $ZrO_2$ | 1.99 |
| $Sb_2O_3$ | 0.32 |
| $Na_2O$ | 0.45 |
| $K_2O$ | 0.19 |

EXAMPLE II

A transparent telescope mirror blank is formed from a glass composition having the following formulation, wherein the components are indicated in weight percent based on the total composition:

| Component | Weight Percent |
| --- | --- |
| $SiO_2$ | 68.4 |
| $Al_2O_3$ | 22 |
| CaO | 2 |
| $Li_2O$ | 3.9 |
| $TiO_2$ | 1 |
| $ZrO_2$ | 1.5 |
| $Na_2O$ | 0.7 |
| $K_2O$ | 0.2 |
| $Sb_2O_3$ | 0.3 |

The molten glass is poured into a suitable mold to form a 16-inch mirror blank and the blank is air-quenched after formation to minimize nuclei formation. Thereafter, the mirror blank was subjected to a heat treatment at 1350° F. for 260 hours and 1600° F. for about 1 hour. It was observed that a satisfactory transparent crystallized glass-ceramic mirror blank of nearly zero coefficient of expansion (0°–300° C.) was obtained.

Another 16 inch glass mirror blank is formed in the same manner from these same compositions, and when heat treated at 1300° F. for 240 hours, then heated up at a rate of 10° F. per hour to 1550° F. and held at that temperature for 64 hours, the coefficient of expansion of the resulting transparent, crystallized glass-ceramic mirror blank is $2.9 \times 10^{17}$(0°–300° C.). The glass composition utilized in example II was prepared by first melting together the following batch ingredients:

EXAMPLE III

A telescope mirror blank was made from the following glass composition wherein the components are indicated in weight percent based on the total composition:

| Component | Weight Percent |
| --- | --- |
| $SiO_2$ | 68.1 |
| $Al_2O_3$ | 20.9 |
| CaO | 3.5 |
| $Li_2O$ | 3.8 |
| $TiO_2$ | 1.8 |
| $ZrO_2$ | 1.5 |
| $Na_2O$ | 0.1 |
| $Sb_2O_3$ | 0.3 |

Again, the telescope mirror blank is formed in a suitable graphite mold which has been preheated to approximately 800° F. The molded blank is then air-quenched to minimize nuclei formation. Thereafter, the mirror blank was subjected to an isothermal heat treatment at 1425° F. (viscosity of this glass at 1435° F. is about $10^{11.4}$ poises) for a period of 1,000 hours whereby nucleation and crystallization occur and produce a transparent crystallized mirror blank having an average coefficient of thermal expansion (0°–300° C.) of $-0.3 \times 10^{17}$.

EXAMPLE IV

A 12-inch telescope mirror blank is formed from the following glass composition having the following components set forth in the indicated weight percentages:

| Component | Weight Percent |
| --- | --- |
| $SiO_2$ | 67.6 |
| $Al_2O_3$ | 20.9 |
| CaO | 4 |
| $Li_2O$ | 3.8 |
| $TiO_2$ | 1.8 |
| $ZrO_2$ | 1.5 |
| $Na_2O$ | 0.1 |
| $Sb_2O_3$ | 0.3 |

The mirror blank was subjected to a heat treatment at 1,350° F. for a period of 1000 hours and the resultant transparent crystallized glass-ceramic mirror blank had a coefficient of thermal expansion of $0.8 \times 10^{17}$(0°–300° C.).

EXAMPLE V

A telescope mirror blank was made from the following composition, wherein the components are set forth in percent by weight:

| Component | Weight Percent |
| --- | --- |
| $SiO_2$ | 66.6 |
| $Al_2O_3$ | 20.9 |
| CaO | 4.5 |
| $Li_2O$ | 3.8 |
| $TiO_2$ | 1.8 |
| $ZrO_2$ | 2.0 |
| $Na_2O$ | 0.1 |
| $Sb_2O_3$ | 0.3 |

The cast

The cast mirror blank, of a diameter of 16 inches, is then subjected to a heat treatment at a temperature of 1425° F. and maintained at this temperature for 1000 hours. The resultant transparent glasseceramic telescope mirror blank has a coefficient of thermal expansion of $0.3\times10^{17}(0°-300°C.)$.

EXAMPLE VI

A 12-inch telescope mirror blank is formed from the following glass composition wherein the components are expressed in weight percent:

| Component | Weight Percent |
| --- | --- |
| $SiO_2$ | 69 |
| $Al_2O_3$ | 19 |
| CaO | 4 |
| $Li_2O$ | 3.8 |
| $TiO_2$ | 1.8 |
| $ZrO_2$ | 2 |
| $Na_2O$ | 0.1 |
| $Sb_2O_3$ | 0.3 |

The cast mirror blank was subjected to a temperature of 1375° F. for a period of 480 hours. A transparent, crystallized mirror blank having an average coefficient of thermal expansion ($a°-300°C.$) of $0.6\times10^{17}$ is produced.

EXAMPLE VII

A 43-inch telescope mirror blank is produced from the following composition wherein the components are expressed in terms of weight percent of the total composition:

| Component | Weight Percent |
| --- | --- |
| $SiO_2$ | 67.4 |
| $Al_2O_3$ | 20.8 |
| $Li_2O$ | 3.53 |
| CaO | 3.46 |
| $ZrO_2$ | 2.05 |
| $TiO_2$ | 1.76 |
| $Na_2O$ | 0.5 |
| $K_2O$ | 0.2 |
| $Sb_2O_3$ | 0.3 |

The cast mirror blank, after cooling, is held at 1150° F. for 1 hour, heated at a rate of 40° F. per hour to 1375° F., where it is held for 24 hours, further heated at a rate of 30° F. per hour to 1550° F., where it is held for 3 hours, then cooled at a rate of 30° F. per hour down to 1300° F. and at a rate of 100° F. per hour to room temperature.

The average coefficient of expansion of the transparent glass-ceramic mirror blank so produced is −0.5 over the range zero to 38° C., and nearly zero over the range 0°–300° C.

EXAMPLE VIII

A 16-inch telescope mirror blank is produced from the following composition wherein the components are expressed in terms of weight percent of the total composition:

| Component | Weight Percent |
| --- | --- |
| $SiO_2$ | 67.7 |
| $Al_2O_3$ | 20.9 |
| $Li_2O$ | 3.9 |
| CaO | 3.5 |
| $ZrO_2$ | 1.5 |
| $TiO_2$ | 1.5 |
| $Na_2O$ | 0.5 |
| $K_2O$ | 0.2 |
| $Sb_2O_3$ | 0.3 |

The cast 16-inch telescope mirror blank is subjected to a temperature of 1350° F. for a period of 2000 hours. The transparent crystallized mirror blank which is produced has an average coefficient of thermal expansion (0°–300° C.) of $0.5\times10^{116\ 7}$.

EXAMPLE LX

A 12-inch telescope mirror blank is formed from the following glass composition having the following components set forth in the indicated weight percentages:

| Component | Weight Percent |
| --- | --- |
| $SiO_2$ | 67.2 |
| $Al_2O_3$ | 20.9 |
| $Li_2O$ | 3.9 |
| CaO | 3.5 |
| $ZrO_2$ | 2 |
| $TiO_2$ | 1.5 |
| $Na_2O$ | 0.5 |
| $K_2O$ | 0.2 |
| $Sb_2O_3$ | 0.3 |

The mirror blank is subjected to a heat treatment at 1400° F. for a period of 1000 hours and the resultant transparent crystallized glass-ceramic mirror blank has a coefficient of thermal expansion of $0.0\times10^{17}(0°-300°C.)$.

EXAMPLE X

A 16-inch telescope mirror blank is produced from the following composition wherein the components are expressed in terms of weight percent of the total composition:

| Component | Weight Percent |
| --- | --- |
| $SiO_2$ | 67.7 |
| $Al_2O_3$ | 20.5 |
| $Li_2O$ | 3.5 |
| CaO | 3.5 |
| $ZrO_2$ | 2 |
| $TiO_2$ | 1.8 |
| $Na_2O$ | 0.5 |
| $K_2O$ | 0.2 |
| $Sb_2O_3$ | 0.3 |

The cast mirror blank, after cooling, is held at 1200° F. for 2 hours, heated at a rate of 15° F. per hour to 1375° F., where it is held for 32 hours, further heated at a rate of 5° F. per hour to 1450° F., where it is held for three-fourth hour, then cooled at a rate of 5° F. per hour down to 1375° F. and at a rate of 15° F. per hour to room temperature.

The average coefficient of expansion of the transparent glass-ceramic mirror blank so produced is $0.6\times10^{17}$ over the range 0°–300° C.

EXAMPLE XI

A 13-inch telescope mirror blank about 2 inches thick is produced from the following composition wherein the components are expressed in terms of weight percent of the total composition;

| Component | Weight Percent |
| --- | --- |
| $SiO_2$ | 68.1 |
| $Al_2O_3$ | 20.6 |
| $Li_2O$ | 3.2 |
| CaO | 3.5 |
| $ZrO_2$ | 2 |
| $TiO_2$ | 1.7 |
| $Na_2O$ | 0.5 |
| $K_2O$ | 0.2 |
| $Sb_2O_3$ | 0.3 |

The cast mirror blank, after cooling, is held at 1200° F. for 2 hours, heated at a rate of 15° F. per hour to 1375° F., where it is held for 16 hours, further heated at a rate of 8° F. per hour to 1500° F., where it is held for 10 hours, then cooled at a rate of 8° F. per hour down to 1375° F. and at a rate of 100° F. per hour to room temperature.

The average coefficient of expansion of the transparent glass-ceramic mirror blank so produced is $3.6 \times 10^{17}$ over the range 0°–300° C.

It will be apparent from the foregoing that many advantages are inherent in the present invention, including low-thermal expansion characteristics, excellent transparency, and the like. Besides telescope mirror blanks, glass articles or crystallized glass-ceramic articles made in accordance with the disclosed invention will find uses as building blocks, flooring tiles and the like.

We claim:

1. A glass composition thermally in situ crystallizable to form a transparent at least partially crystalline ceramic which (1) has an average lineal coefficient of thermal expansion of $-5$ to $5 \times 10^{17}$ over the range from zero to 300° C., (2) contains as predominant crystalline species lithium-containing crystalline phases selected from the group consisting of beta eucryptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals and (3) consists essentially of the following components in the following weight percentage ranges in the total glass, including an effective amount of a nucleating agent selected from $TiO_2$ and $ZrO_2$, or both,

| Component | Weight Percent |
| --- | --- |
| $SiO_2$ | 58–72 |
| $Al_2O_3$ | 19–24 |
| $Li_2O$ | 3.7–5 |
| CaO | 2–6 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2 + ZrO_2$ | up to 4 |
| ($CaO + R_2O$ minus $Li_2O$) | less than 1 |
| ZnO | no more than 0.3 |
| $P_2O_5$ | no more than 0.3 |
| $B_2O_3$ | no more than 0.2 |
| ($ZnO + P_2O_5$) | no more than 0.4 |
| ($ZnO + B_2O_3$) | no more than 0.3 | where R is any Group IA alkali metal other than Li.

2. A glass composition of claim 1, in which is 98–100 percent by weight of the components set forth therein, other than said $ZnO$, $B_2O_3$ and $P_2O_5$.

3. A glass composition thermally in situ crystallizable to form a transparent at least partially crystalline ceramic which (1) has an average lineal coefficient of thermal expansion of $-5$ to $5 \times 10^{1167}$ over the range from zero to 300° C., (2) contains as predominant crystalline species lithium-containing crystalline phases selected from the group consisting of beta eucryptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals and (3) consists essentially of the following components in the following weight percentage ranges in the total glass, including an effective amount of a nucleating agent selected from $TiP_2$ and $ZrO_2$, or both,

| Component | Weight Percent |
| --- | --- |
| $SiO_2$ | 64–71 |
| $Al_2O_3$ | 19–24 |
| $Li_2O$ | 3.8–4.5 |
| CaO | 3–5 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2 + ZrO_2$ | up to 4 |
| ($CaO + R_2O$ minus $Li_2O$) | less than 1 |
| ZnO | no more than 0.3 |
| $P_2O_5$ | no more than 0.3 |
| $B_2O_3$ | no more than 0.2 |
| ($ZnO + P_2O_5$) | no more than 0.4 |
| ($ZnO + B_2O_3$) | no more than 0.3 | where R is any Group IA alkali metal other than Li.

4. A glass composition of claim 3, which is 98–100 percent by weight of the components set forth therein, other than said $ZnO$, $B_2O_3$ and $P_2R_5$.

5. A glass composition thermally in situ crystallizable to form a transparent at least partially crystalline ceramic which (1) has an average lineal coefficient of thermal expansion of $-5$ to $5 \times 10^{+7}$ over the range from zero to 300° C., (2) contains as predominant crystalline species lithium-containing crystalline phases selected from the group consisting of beta eucryptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals and (3) consists essentially of the following components in the following weight percentage ranges in the total glass

| Component | Weight Percent |
| --- | --- |
| $SiO_2$ | 58–72 |
| $Al_2O_3$ | 19–24 |
| $Li_2O$ | 3–5 |
| CaO | 2–6 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2 + ZrO_2$ | 1.5–4 |
| ($CaO + R_2O$ minus $Li_2O$) | less than 1 |
| ZnO | no more than 0.3 |
| $P_2O_5$ | no more than 0.3 |
| $B_2O_3$ | no more than 0.2 |
| ($ZnO + P_2O_5$) | no more than 0.4 |
| ($ZnO + B_2O_3$) | no more than 0.3 | where R is any Group IA alkali metal other than Li.

6. A glass composition of claim 5, which is 98–100 percent by weight of the components set forth therein, other than said $ZnO$, $B_2O_3$ and $P_2O_5$.

7. A glass composition thermally in situ crystallizable to form a transparent at least partially crystalline ceramic which (1) has an average lineal coefficient of thermal expansion of $-5$ to $5 \times 10^{+7}$ over the range from zero to 300° C., (2) contains as predominant crystalline species lithium-containing crystalline phases selected from the group consisting of beta eucryptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals and (3) consists essentially of the following components in the following weight percentage ranges in the total glass

| Component | Weight Percent |
| --- | --- |
| $SiO_2$ | 64–71 |
| $Al_2O_3$ | 19–24 |
| $Li_2O$ | 3–4.5 |
| CaO | 3–5 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2 + ZrO_2$ | 1.5–4 |
| ($CaO + R_2O$ minus $Li_2O$) | less than 1 |

| Component | Weight Percent |
| --- | --- |
| ZnO | no more than 0.3 |
| $P_2O_5$ | no more than 0.3 |
| $B_2O_3$ | no more than 0.2 |
| $(ZnO+P_2O_5)$ | no more than 0.4 |
| $(ZnO+B_2O_3)$ | no more than 0.3 | where R is any Group IA alkali metal other than Li.

8. A glass composition of claim 7 wherein the weight percent of $Li_2O$ lies in the range 3.8 to 4.5.

9. A shaped, at least partially crystalline transparent ceramic article having an average lineal coefficient of thermal expansion in the range from $-5$ to $5\times10^{17}/°$ C. over the range from zero to 300° C., said ceramic article having been formed by thermal in situ crystallization of a preformed thermally crystallizable glass article of essentially uniform composition consisting essentially of the following components containing an effective amount of a nucleating agent selected from $TiO_2$ and $ZrO_2$, or both, and in the following weight percentage ranges in the total glass

| Component | Weight Percent |
| --- | --- |
| $SiO_2$ | 58–72 |
| $Al_2O_3$ | 19–24 |
| $Li_2O$ | 3.7–5 |
| CaO | 2–6 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2+ZrO_2$ | up to 4 |
| $(CaO+R_2O$ minus $Li_2O)$ | less than 1 |
| ZnO | no more than 0.3 |
| $P_2O_5$ | no more than 0.3 |
| $B_2O_3$ | no more than 0.2 |
| $(ZnO+P_2O_5)$ | no more than 0.4 |
| $(ZnO+B_2O_3)$ | no more than 0.3 | where R is any Group IA alkali metal other than Li, said transparent crystallized ceramic containing as predominent crystalline species lithium-containing crystalline phases selected from the group consisting of beta-eucryptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals.

10. A shaped, at least partially crystalline transparent ceramic article having an average lineal coefficient of thermal expansion in the range FROM $-5$ to $5\times10^{17}/°$ C. over the range from zero to 300° C., said ceramic mirror blank having been formed by thermal in situ crystallization of a preformed thermally crystallizable glass blank of essentially uniform composition consisting essentially of the following components in the following weight percentage ranges in the total glass

| Component | Weight Percent |
| --- | --- |
| $SiO_2$ | 64–71 |
| $Al_2O_3$ | 19–24 |
| $Li_2O$ | 3–4.5 |
| CaO | 3–5 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2+ZrO_2$ | 1.5–4 |
| $(CaO+R_2O$ minus $Li_2O)$ | less than 1 |
| ZnO | no more than 0.3 |
| $P_2O_5$ | no more than 0.3 |
| $B_2O_3$ | no more than 0.2 |
| $(ZnO+P_2O_5)$ | no more than 0.4 |
| $(ZnO+B_2O_3)$ | no more than 0.3 | where R is any Group IA alkali metal other than Li, said transparent crystallized ceramic containing as predominent crystalline species lithium-containing phases selected from the group consisting of beta-eucyptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals.

11. A shaped, at least partially crystalline transparent ceramic article having an average lineal coefficient of thermal expansion in the range from $-5$ to $5\times10^{17}/°$ C. over the range from zero to 300° C., said ceramic article having been formed by thermal in situ crystallization of a preformed thermally crystallizable glass article of essentially uniform composition consisting essentially of the following components in the following weight percentage ranges in the total glass

| Component | Weight Percent |
| --- | --- |
| $SiO_2$ | 58–72 |
| $Al_2O_3$ | 19–24 |
| $Li_2O$ | 3–5 |
| CaO | 2–6 |
| $TiO_2$ | 0–2.5 |
| ZrO | 0–4 |
| $Na_2O$ | 0–1 |
| $K_2O$ | 0–1 |
| Total $R_2O$ | 0–1.5 |
| $TiO+ZrO_2$ | 1.5–4 |
| $(CaO+R_2O$ minus $Li_2O)$ | less than 1 |
| ZnO | no more than 0.3 |
| $P_2O_5$ | no more than 0.3 |
| $B_2O_3$ | no more than 0.2 |
| $(ZnO+P_2O_5)$ | no more than 0.4 |
| $(ZnO+B_2O_3)$ | no more than 0.3 | where R is any Group IA alkali metal other than Li, said transparent crystallized ceramic containing as predominant crystalline species lithium-containing crystalline phases selected from the group consisting of beta-eucryptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals.

12. An article according to claim 11, wherein the recited glass is composed of 98 to 100 percent by weight of the components recited therein, other than said ZnO, $B_2O_3$ and $P_2O_5$.

13. A shaped article of claim 11 which is a telescope mirror blank.

14. A method of making a low expansion, essentially transparent article of an essentially uniform low average coefficient of expansion in the range from $-5$ to $+5\times10^{17}/°$ C. over the range from zero to 300° C., which comprises (1) making a glass melt of an essentially uniform composition containing an effective amount of a nucleating agent selected from $TiO_2$ and $ZrO_2$, or both, and consisting essentially of the following components in the following weight percentage ranges in the total glass

| Component | Weight Percent |
| --- | --- |
| $SiO_2$ | 58–72 |
| $Al_2O_3$ | 19–24 |
| $Li_2O$ | 3.7–5 |
| CaO | 2–6 |
| $TiO_2$ | 0–2.5 |
| $ZrO_2$ | 0–4 |
| $Na_2O$ | 0–1 |
| $K_2O$ | 0–1 |
| Total $R_2O$ | 0–1.5 |
| $TiO_2+ZrO_2$ | up to 4 |
| $(CaO+R_2O$ minus $Li_2O)$ | less than 1 |
| ZnO | no more than 0.3 |

| | |
|---|---|
| P$_2$O$_5$ | **no more than 0.3 |
| B$_2$O$_3$ | no more than 0.2 |
| (ZnO+P$_2$O$_5$) | no more than 0.4 |
| (ZnO+$_2$O$_3$) | no more than 0.3 | where R is any group IA group alkali metal other than Li; (2) forming a glass article from said glass melt and (3) thermally in situ crystallizing said glass article by heating until the glass article has been converted to an at least partially crystalline transparent ceramic article of an expansion as recited, said ceramic article containing as predominent crystalline species lithium-containing crystalline phases selected from the group consisting of beta-eucryptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals.

15. A method of making a low expansion, essentially transparent article of an essentially uniform low average coefficient of expansion in the range from −5 to +5×10$^{17}$/° C. over the range from zero to 300° C., which comprises (1) making a glass melt of an essentially uniform composition consisting essentially of the following components in the following weight percentage ranges in the total glass

| Component | Weight Percent |
|---|---|
| SiO$_2$ | 58–72 |
| Al$_2$O$_3$ | 19–24 |
| Li$_2$O | 3–5 |
| CaO | 2–6 |
| TiO$_2$ | 0–2.5 |
| ZrO$_2$ | 0–4 |
| Na$_2$O | 0–1 |
| K$_2$O | 0–1 |
| Total R$_2$O | 0–1.5 |
| TiO$_2$+$_{ZrO_2}$ | 1.5–4 |
| (CaO+R$_2$O minus Li$_2$O) | less than 1 |
| ZnO | no more than 0.3 |
| P$_2$O$_5$ | no more than 0.3 |
| B$_2$O$_3$ | no more than 0.2 |
| (ZnO+P$_2$O$_5$) | no more than 0.4 |
| (ZnO+B$_2$O$_3$) | no more than 0.3 | where R is any Group IA alkali metal other than Li; (2) forming a glass article from said glass melt and (3) thermally in situ crystallizing said glass article by heating until the glass article has been converted to an at least partially crystalline transparent ceramic article of an expansion as recited, said ceramic article containing as predominant crystalline species lithium-containing crystalline phases selected from the group consisting of beta-eucryptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals.

16. A method of claim 15, wherein the glass composition recited therein is 98–100 percent by weight of the components set forth therein, other than said ZnO, B$_2$O$_3$ and P$_2$O$_5$.

17. A method of making a low expansion, essentially transparent article of an essentially uniform low average coefficient of expansion in the range from −5 to +5×10$^{17}$/° C. over the range from zero to 300° C., which comprises (1) making a glass melt of an essentially uniform composition consisting essentially of the following components in the following weight percentage ranges in the total glass

| Component | Weight Percent |
|---|---|
| SiO$_2$ | 64–71 |
| Al$_2$O$_3$ | 19–24 |
| Li$_2$O | 3–4.5 |
| CaO | 3–5 |
| TiO$_2$ | 0–2.5 |
| ZrO$_2$ | 0–4 |
| Na$_2$O | 0–1 |
| K$_2$O | 0–1 |
| Total R$_2$O | 0–1.5 |
| TiO$_2$+ZrO$_2$ | 1.5–4 |
| (CaO+R$_2$O minus Li$_2$O) | less than 1 |
| ZnO | no more than 0.3 |
| P$_2$O$_5$ | no more than 0.3 |
| B$_2$O$_3$ | no more than 0.2 |
| (ZnO+P$_2$O$_5$) | no more than 0.4 |
| (ZnO+B$_2$O$_3$) | no more than 0.3 | where R is any group IA alkali metal other than Li; (2) forming a glass article from said glass melt and (3) thermally in situ crystallizing said glass article by heating until the glass article has been converted to an at least partially crystalline transparent ceramic article of an expansion as recited, said ceramic article containing as predominant crystalline species lithium-containing crystalline phases selected from the group consisting of beta-eucryptite beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than one-third micron measured across the largest lineal dimension of the crystals.

18. The method of claim 17 wherein the glass composition recited therein is 98–100 percent by weight of the components set forth therein, other than said ZnO, B$_2$O$_3$ and P$_2$O$_5$.

* * * * *

PO-1050
(5/69)

UNITED STATES PATENT OFFICE
CERTIFICATE OF CORRECTION

Patent No. 3,615,759            Dated  October 26, 1971

Inventor(s) Robert A. Busdiecker and James E. Rapp

It is certified that error appears in the above-identified patent and that said Letters Patent are hereby corrected as shown below:

Col. 1, line 13, after "Jan. 21, 1966" insert --now abandoned--;
Col. 2, line 2, "$-5\text{ to }+5\times10^{17}/°C$" should be -- $-5\text{ to }+5\times10^{-7}/°C$.--
Col. 3, line 75, "$RiO_2$" should be --$TiO_2$--;
Col. 4, line 39, "$-5\times10^{17}$" should be -- $-5\times10^{-7}$--;
Col. 4, line 40, "$10^{17}/C$" should be --$10^{-7}/C$--;
Col. 4, line 40 "$-3\text{ to }3\times10^{17}$" should be -- $-3\text{ to }3\times10^{-7}$--;
Col. 4, line 45 "$+5\text{ to }-5\times10^{17}$" should be --$+5\text{ to }-5\times10^{-7}$--;
Col. 5, line 30, "$2\times10^{17}$" should be --$2\times10^{-7}$--;
Col. 6, line 30, "$10^{11\cdot4}$" should be "$10^{11\cdot5}$"--;
Col. 6, line 34, "$-0.3\times10^{17}$" should be -- $-0.3\times10^{-7}$--;
Col. 6, line 55, "$0.8\times10^{17}$" should be --$0.8\times10^{-7}$--;
Col. 7, line 3, "$0.3\times10^{17}$" should be --$0.3\times10^{-7}$--;
Col. 7, line 25 "$a°-300°C$" should be --$0-300°C$--;
Col. 7, line 75 "$0.5\times10^{116\ 7}$" should be --$0.5\times10^{-7}$--;
Col. 8, line 1, "EXAMPLE LX" should be --EXAMPLE IX--;
Col. 8, line 49, "$0.6\times10^{17}$" should be --$0.6\times10^{-7}$--;
Col. 9, line 2 "$3.6\times10^{17}$" should be --$3.6\times10^{-7}$--;
Col. 9, line 15 "$-5\text{ to }5\times10^{17}$" should be -- $-5\text{ to }5\times10^{-7}$--;
Col. 9, line 54, "$-5\text{ to }5\times10^{116\ 7}$" should be -- $-5\text{ to }5\times10^{-7}$--;
Col. 9, line 66 "$TiP_2$" should be --$TiO_2$--;
Col. 10, line 13, "$P_2R_5$" should be --$P_2O_5$--;
Col. 10, line 17, "$-5\text{ to }5\times10^{+7}$" should be -- $-5\text{ to }5\times10^{-7}$--;
Col. 10, line 53 "$-5\text{ to }5\times10^{+7}$" should be -- $-5\text{ to }5\times10^{-7}$--;
Col. 11, line 11, "$-5\text{ to }5\times10^{17}$" should be -- $-5\text{ to }5\times10^{-7}$--;
Col. 11, line 51, "$-5\text{ to }5\times10^{17}/°C$" should be -- $-5\text{ to }5\times10^{-7}/°C$--;
Col. 12, line 13, "$-5\text{ to }5\times10^{17}$" should be -- $-5\text{ to }5\times10^{-7}$--;
Col. 12, line 56 "$-5\text{ to }+5\times10^{17}/°C$" should be -- $-5\text{ to }+5\times10^{-7}/°C$--;
Col. 13, line 4 "$(ZnO+_2O_3)$" should be --$(ZnO+B_2O_3)$--;
Col. 13, line 20 "$-5\text{ to }+5\times10^{-17}/°C$" should be -- $-5\text{ to }+5\times10^{-7}/°C$--
Col. 13, line 35 "$TiO_2+zrO_2$" should be --$TiO_2 + ZrO_2$--;
Col. 14, line 12 "$-5\text{ to }+5\times10^{17}/°C$" should be -- $-5\text{ to }+5\times10^{-7}/°C$--;
Cover page "W. A. Schaick" should be --W. A. Schaich--.

Signed and sealed this 25th day of April 1972.

(SEAL)
Attest:

EDWARD M. FLETCHER, JR.
Attesting Officer

ROBERT GOTTSCHALK
Commissioner of Patents